(12) United States Patent
Woo et al.

(10) Patent No.: US 11,317,074 B2
(45) Date of Patent: Apr. 26, 2022

(54) METHOD AND APPARATUS FOR PROCESSING DATA FOR THREE-DIMENSIONAL IMAGE

(71) Applicant: Samsung Electronics Co., Ltd., Suwon-si (KR)

(72) Inventors: Jihwan Woo, Suwon-si (KR); Sungryeul Rhyu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 90 days.

(21) Appl. No.: 16/963,374

(22) PCT Filed: Jan. 18, 2019

(86) PCT No.: PCT/KR2019/000752
§ 371 (c)(1),
(2) Date: Jul. 20, 2020

(87) PCT Pub. No.: WO2019/143174
PCT Pub. Date: Jul. 25, 2019

(65) Prior Publication Data
US 2021/0377507 A1    Dec. 2, 2021

(30) Foreign Application Priority Data

Jan. 20, 2018 (KR) ........................ 10-2018-0007419

(51) Int. Cl.
*H04N 13/161* (2018.01)
*H04N 13/194* (2018.01)
(Continued)

(52) U.S. Cl.
CPC ........... *H04N 13/161* (2018.05); *H04N 13/15* (2018.05); *H04N 13/156* (2018.05);
(Continued)

(58) Field of Classification Search
CPC .. H04N 13/161; H04N 19/597; H04N 13/156; H04N 13/15; H04N 13/383; H04N 13/194
(Continued)

(56) References Cited

U.S. PATENT DOCUMENTS 9,734,595 B2    8/2017 Lukac et al.
2014/0334670 A1    11/2014 Guigues et al.
(Continued)

FOREIGN PATENT DOCUMENTS

KR    10-2014-0133773 A    11/2014
KR    10-2017-0018930 A    2/2017
(Continued)

OTHER PUBLICATIONS

Korean Office Action Jan. 3, 2022, issued in a counterpart Korean Application No. 10-2018-0007419.

*Primary Examiner* — Tung T Vo
(74) *Attorney, Agent, or Firm* — Jefferson IP Law, LLP

(57) ABSTRACT

A method for transmitting data for a three-dimensional image is provided. The method comprises the steps of: generating a plurality of voxelized points corresponding to a plurality of voxels, respectively, from a plurality of points constituting a three-dimensional image; grouping the plurality of voxelized points into a plurality of segments, wherein each of the plurality of segments includes at least one of the plurality of voxelized points; for each segment, projecting the plurality of points and generating a plurality of two-dimensional images; generating a packed two-dimensional image from the generated plurality of two-dimensional images; decoding data for the packed two-dimensional image, and encapsulating same; and transmitting the decoded and encapsulated data.

8 Claims, 12 Drawing Sheets

(51) Int. Cl.
  *H04N 13/156*  (2018.01)
  *H04N 13/383*  (2018.01)
  *H04N 13/15*  (2018.01)
  *H04N 19/597*  (2014.01)

(52) U.S. Cl.
  CPC ......... *H04N 13/194* (2018.05); *H04N 13/383* (2018.05); *H04N 19/597* (2014.11)

(58) Field of Classification Search
  USPC .......................................................... 348/43
  See application file for complete search history.

(56) References Cited

U.S. PATENT DOCUMENTS

| | | |
|---|---|---|
| 2016/0088280 A1 | 3/2016 | Sadi et al. |
| 2017/0347100 A1 | 11/2017 | Chou et al. |
| 2017/0347120 A1 | 11/2017 | Chou et al. |
| 2017/0347122 A1 | 11/2017 | Chou et al. |
| 2020/0228836 A1* | 7/2020 | Schwarz ................. G06T 15/04 |
| 2020/0302650 A1* | 9/2020 | Aksu ......................... G06T 9/00 |
| 2021/0105492 A1* | 4/2021 | Aksu ..................... H04N 19/70 |

FOREIGN PATENT DOCUMENTS

| | | |
|---|---|---|
| KR | 10-2017-0052675 A | 5/2017 |
| KR | 10-2017-0126740 A | 11/2017 |
| KR | 10-1799351 B1 | 11/2017 |
| KR | 10-1819730 B1 | 1/2018 |

* cited by examiner

METHOD AND APPARATUS FOR PROCESSING DATA FOR THREE-DIMENSIONAL IMAGE

CROSS-REFERENCE TO RELATED APPLICATION(S)

This application is a U.S. National Stage application under 35 U.S.C. § 371 of an International application number PCT/KR2019/000752, filed on Jan. 18, 2019, which is based on and claimed priority of a Korean patent application number 10-2018-0007419, filed on Jan. 20, 2018, in the Korean Intellectual Property Office, the disclosure of which is incorporated by reference herein in its entirety.

BACKGROUND

1. Field

The disclosure relates to a method and device for processing data for three-dimensional images and particularly to a method and device for compressing data for point cloud data.

2. Description of Related Art

The Internet is evolving from the human-centered connection network by which humans create and consume information to the Internet of Things (IoT) network by which information is communicated and processed between things or other distributed components. The Internet of Everything (IoE) technology may be an example of a combination of the Big data processing technology and the IoT technology through, e.g., a connection with a cloud server.

Implementing IoT requires technical elements, such as sensing technology, a wired/wireless communication and network infrastructure, service interface and security technologies. Recent ongoing research for thing-to-thing connection has been on techniques for sensor networking, machine-to-machine communication (M2M), or machine-type communication (MTC).

In the IoT environment, intelligent Internet Technology (IT) services may be offered that collect and analyze the data generated by the things connected with one another to create new value for human life. IoT may have various applications, such as the smart home, smart building, smart city, smart car or connected car, smart grid, health-care, or smart appliance industry, or state-of-art medical services, through conversion or integration of existing IT technologies and various industries.

Meanwhile, moving picture experts group (MPEG), the multimedia-related international standard organization, has thus far standardized MPEG-2, MPEG-4, MPEG-7, and MPEG-21, starting with MPEG-back in year 1998. Multimedia application format (MAF) may raise the usability of the standards by actively responding to the demand from the industry by using non-MPEG standards together with legacy MPEG standards. MAF standardization aims to provide a chance for easily taking advantage of MPEG technology in industry. Major goals of MAF standardization include the spread of the MPEG standard and wide use of relevant applications by providing a standardized file format for a particular application.

Meanwhile, data for three dimensional images may be represented as a point cloud. Point cloud means a set of massive points. Point refers to a point in a three-dimensional space and may be represented in the form of a vector with both position coordinates and a color. For example, the point may be represented as (x, y, z, R, G, B).

Data for a point cloud representing a 3D image occupies massive memory resources and thus leads to a need for a point cloud compression method. However, conventional point cloud compression methods take time to generate and spread a new codec. Thus, a need arises for an efficient method to utilize a legacy codec (e.g., a two-dimensional video compression scheme).

SUMMARY

According to the disclosure, there is provided a method and device for efficiently compressing data for a point cloud using a legacy codec and a legacy network.

Objects of the present invention are not limited to the foregoing, and other unmentioned objects would be apparent to one of ordinary skill in the art from the following description.

To achieve the foregoing objects, according to an embodiment of the disclosure, a method for transmitting data for a 3D image comprises generating a plurality of voxelized points respectively corresponding to a plurality of voxels from a plurality of points constituting the 3D image, grouping the plurality of voxelized points into a plurality of segments, each of the plurality of segments including at least one point of the plurality of points, generating a plurality of 2D images by projecting the plurality of points per segment, generating a packed 2D image from the plurality of generated 2D images, decoding and encapsulating data for the packed 2D image, and transmitting the encoded and encapsulated data.

According to another embodiment of the disclosure, a method for processing data for a 3D image comprises receiving the data for the 3D image, obtaining a packed 2D image by decapsulating and decoding the received data for the 3D image, obtaining a plurality of 2D images by unpacking the packed 2D image, the plurality of 2D images generated by projecting a plurality of voxelized points per segment, and the plurality of voxelized points generated to respectively correspond to a plurality of voxels from a plurality of points, and the plurality of voxelized points grouped into a plurality of segments, reconstructing a 3D image from the plurality of 2D images, and displaying the reconstructed 3D image.

Embodiments of the present invention present the following effects, at least.

According to the disclosure, data for a point cloud may efficiently be compressed.

According to the disclosure, the legacy 2D video compression scheme and legacy network may be used, saving costs due to development of new technology.

The effects of the present invention are not limited thereto, and the disclosure may encompass other various effects.

DETAILED DESCRIPTION

Advantages and features of the present disclosure, and methods for achieving the same may be understood through the embodiments to be described below taken in conjunction with the accompanying drawings. However, the present invention is not limited to the embodiments disclosed herein, and various changes may be made thereto. The embodiments disclosed herein are provided only to inform one of ordinary skilled in the art of the category of the present disclosure. The present invention is defined only by the appended claims.

Although the terms "first" and "second" are used to describe various components, the components are not limited by the terms. These terms are provided simply to distinguish one component from another. Accordingly, the first component mentioned herein may also be the second component within the technical spirit of the present invention.

Figure 1:
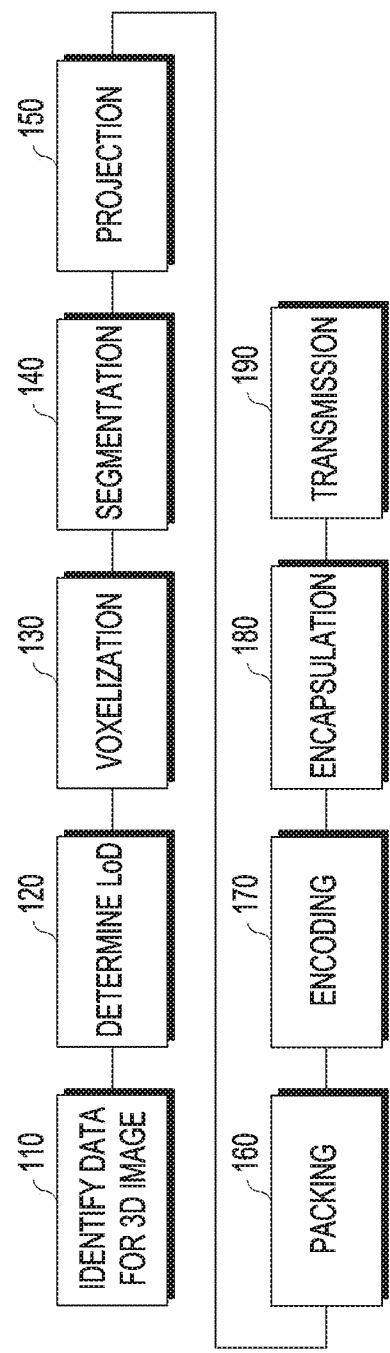
FIG. 1 is a block diagram functionally illustrating a transmitter according to an embodiment of the disclosure.

FIG. 1 is a block diagram functionally illustrating a transmitter according to an embodiment of the disclosure.

The transmitter may identify data for a 3D image (110). The data for the 3D image may be received through a communication interface or may be read out of a storage device. The storage device may be a storage device wiredly or wirelessly connectable to the transmitter or a storage device embedded in the transmitter. In some embodiments, the transmitter may generate a 3D image from images captured from a plurality of cameras. The 3D image may include still images or dynamic images represented by a plurality of frames.

The transmitter may determine the level-of-detail (LoD) for the 3D image from the data for the 3D image (120). The LoD may indicate the precision of the 3D image. The LoD value may be determined based on at least one of the position of interest or the position of gaze of the user viewing the 3D image or the density of points in the point cloud of the 3D image. For example, as the density of the points increases, the LoD may increase. As the area is closer to the position of gaze or position of interest of the user, the area may have a larger LoD. In some embodiments, the density of the points in the point cloud may be identified from the bandwidth upon point cloud capturing. According to some embodiments, the overall LoD for the 3D image may be determined according to the bandwidth upon point cloud capturing, and the LoD for each area of the 3D image may be modified considering the user's position of interest or point of gaze.

The transmitter may perform voxelization based on the LoD (130). Voxels are the units into which a 3D image is split and correspond to the pixels of a 2D image. The size of the voxels may be determined based on the LoD. For example, an area with a higher LoD may have a smaller voxel size, and another area with a lower LoD may have a larger voxel size. Areas where the voxel size is set to 0 may not be subject to voxelization. Voxelization refers to generating one point (i.e., a voxelized point) representing the voxels from one or more points present in the voxel for each of the plurality of voxels of the 3D image. The voxelized point may replace one or more points present in the corresponding voxel. The number of the points constituting the point cloud may be reduced via voxelization and, thus, the size of the data for the 3D image may be reduced.

Figure 2:
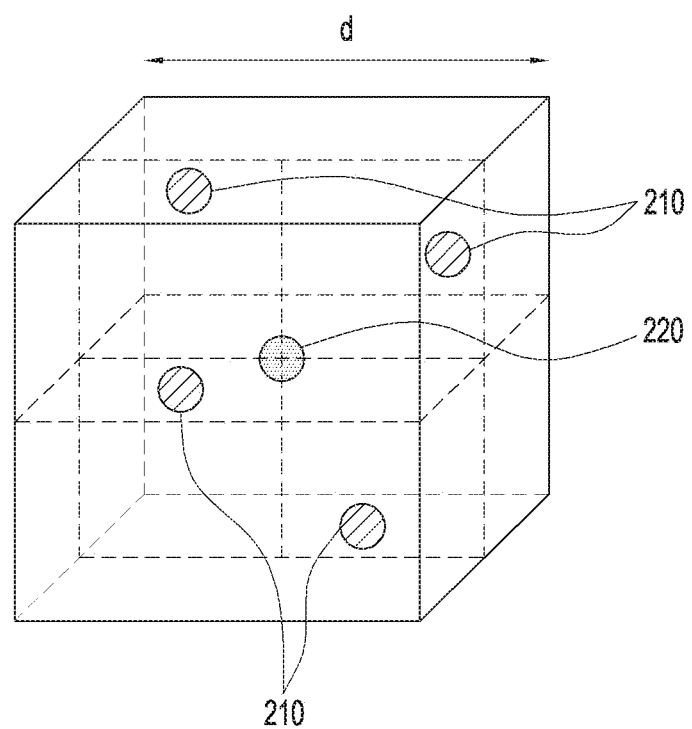
FIG. 2 is a view illustrating voxelization according to an embodiment of the disclosure.

Voxelization is described below in greater detail with reference to FIG. 2. FIG. 2 is a view illustrating voxelization according to an embodiment of the present invention. FIG. 2 illustrates one voxel with an edge length of d. d may be determined depending on the LoD of the area where the illustrated voxel is positioned. As the LoD increases, d may decrease. The transmitter may generate a voxelized point 220 representing the voxels from points 210 in the voxel via voxelization.

The coordinates indicating the position of the voxelized point 220 may be one of i) the coordinates of the center of the voxel, ii) the coordinates indicating the position of the mean of positions of the points 210 in the voxel, and iii) the coordinates of a random position in the voxel. Here, the mean of the points 210 in the voxel may be one of the ordinary mean or weighted mean. FIG. 2 illustrates that the coordinates indicating the position of the voxelized point are the coordinates of the center of the voxel.

The color of the voxelized point 220 may be one of i) the mean color of the points 210 in the voxel and ii) the weighted mean color of the points 210 in the voxel considering the position of the voxelized point 220.

If the 3D image is a dynamic 3D image including a plurality of frames, voxelization on the 3D image of the current frame may be performed only on the areas where the segment configuration is varied. New voxelization is not performed on the areas where no change is made to the segment configuration, and the result of voxelization for the prior frame may be used. This is described below in detail with reference to FIG. 10.

Figure 3:
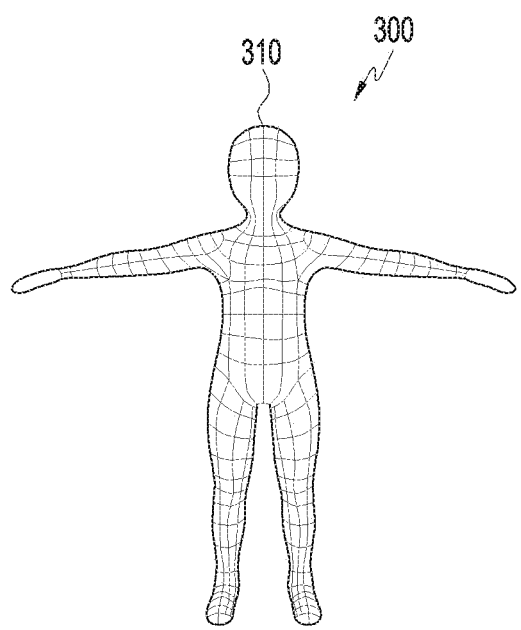
FIG. 3 is a view illustrating segmentation according to an embodiment of the disclosure.

Referring back to FIG. 1, the transmitter may perform segmentation on the point cloud after voxelization has been performed (140). Segmentation means grouping the points constituting the point cloud into a plurality of segments. Segment may denote a set of at least one point bundled up in one group or the space in the 3D image occupied by the points in the group. Each of the plurality of segments may include at least one point. FIG. 3 is a view illustrating segmentation according to an embodiment of the disclosure. Referring to FIG. 3, the 3D image 300 that may be represented by the point cloud may be divided into a plurality of areas 310, and each area may be denoted a segment.

Segmentation may be performed based on at least one of the color, texture, position, and normal information of the points. For example, points having similar colors, similar textures, and adjacent positions may be grouped into one segment. Further, the points adjacent to positions with similar normal directions on the 3D image represented by the point cloud may be grouped into one segment.

Each point may be represented as [RGBXYZ], and each segment may be represented as {[RGBXYZ]$_1$, [RGB- XYZ]$_2$, . . . [RGBXYZ]$_n$}. Information representing each segment may be stored and then transferred to the receiver.

If the 3D image is a dynamic 3D image including a plurality of frames, segmentation on the 3D image of the current frame may be performed only on the areas where the segment configuration is varied. New segmentation is not performed on the areas where no change is made to the segment configuration, and the result of segmentation for the prior frame may be used. This is described below in detail with reference to FIG. 10.

Figure 4:
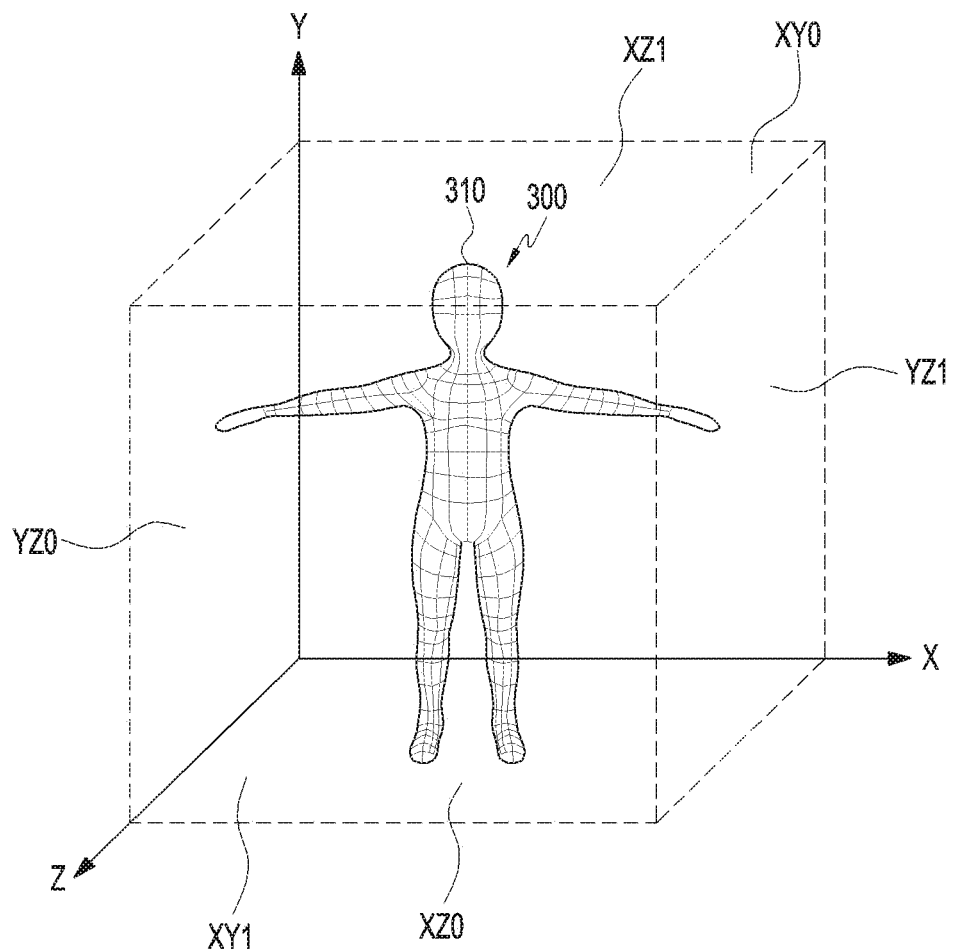
FIG. 4 is a view illustrating projection according to an embodiment of the disclosure.

After performing segmentation, the transmitter may project the 3D image to the 2D image (150). FIG. 4 is a view illustrating projection according to an embodiment of the disclosure. Although FIG. 4 illustrates hexahedron projection, embodiments of the disclosure are not limited, but projection may rather be performed in other various shapes of polygons or stereoscopic shapes. Projection may denote projecting each of the points in the point cloud constituting the 3D image 310 to any one of the surfaces of the stereoscopic object (e.g., a hexahedron) defined along the periphery of the 3D image.

Projection may be performed per segment 310. Among the surfaces XY0, XY1, YZ0, YZ1, XZ0, and XZ1 of the hexahedron, the projection surface may be determined per segment 310. All of the points in the single segment may be projected to the same surface. According to embodiments of the disclosure, by determining the projection surface per segment, the transmitter may reduce processing loads as compared with determining the projection surface per point.

The surface to which the segment 310 is to be projected may be determined based on the distances between the segment 310 and the surfaces XY0, XY1, YZ0, YZ1, XZ0, and XZ1, the area on the 3D image, where the segment 310 is positioned, or the direction of the normal of the area on the 3D image adjacent to the segment 310. For example, among the surfaces XY0, XY1, YZ0, YZ1, XZ0, and XZ1, one close to the segment 310 and positioned along the direction of the normal or positioned adjacent to the direction of the normal may be determined to be the projection surface.

By projection, a plurality of 2D images respectively corresponding to the plurality of surfaces XY0, XY1, YZ0, YZ1, XZ0, and XZ1 may be generated. Each of the plurality of 2D images generated via projection may be denoted a patch.

If the 3D image is a dynamic 3D image including a plurality of frames, the determination of the surface to which each segment is to be projected in the 3D image of the current frame may be performed only on the segments in the areas where a change is made to the segment configuration. For the segments in the areas where no change is made to the segment configuration, the surface, the target, of projection performed on the prior frame may be used.

Figure 5:
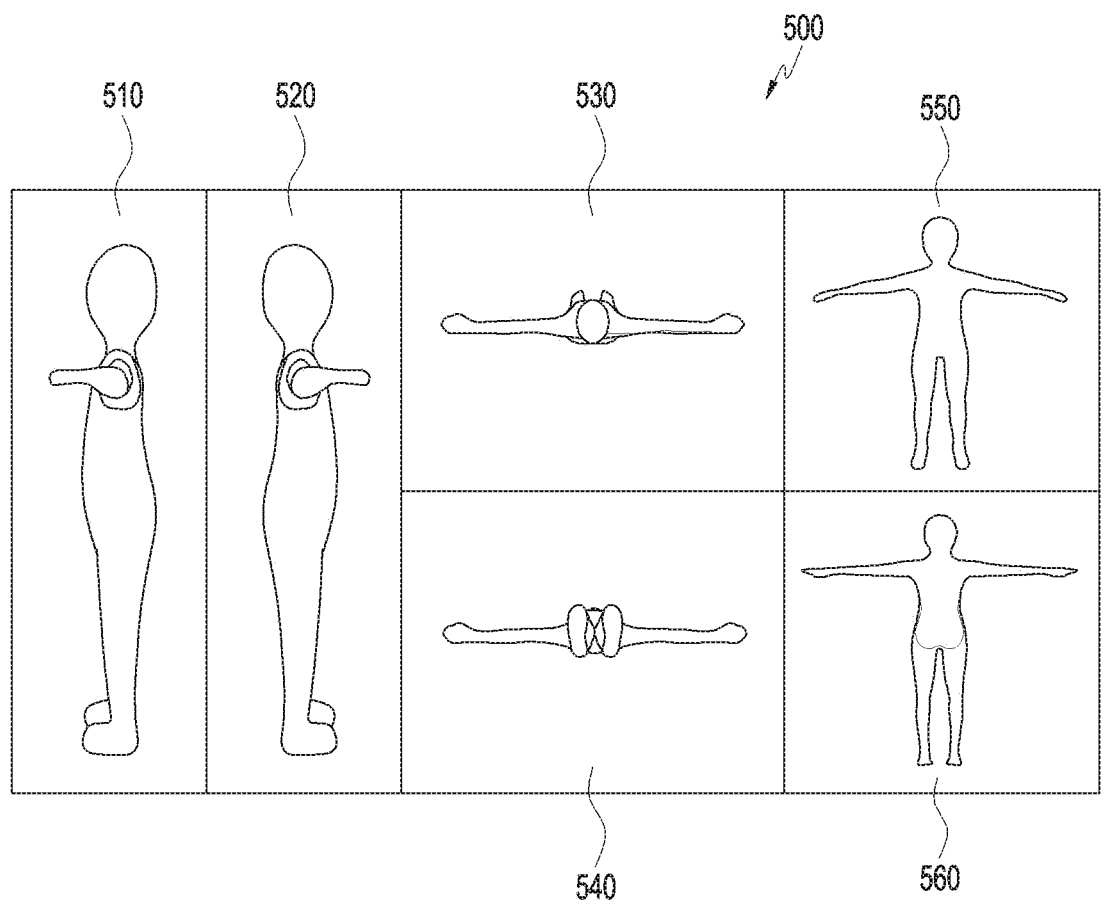
FIG. 5 is a view illustrating a packed 2D image according to an embodiment of the disclosure.

The transmitter may perform packing on the plurality of patches (160). Packing may merge the plurality of patches into a single 2D image (i.e., a packed 2D image). FIG. 5 is a view illustrating a packed 2D image according to an embodiment of the disclosure. The packed 2D image 500 may be generated by merging the plurality of patches 510, 520, 530, 540, 550, and 560. A first patch 510 may be a 2D image projected to the YZ1 surface. A second patch 520 may be a 2D image projected to the YZ0 surface. A third patch 530 may be a 2D image projected to the XZ1 surface. A fourth patch 540 may be a 2D image projected to the XZ0 surface. A fifth patch 550 may be a 2D image projected to the XY1 surface. A sixth patch 560 may be a 2D image projected to the XY0 surface. Each patch may be deformed, resized, rotated, or resampled (i.e., change in resolution) for packing purposes. As such, such packing as applies to a different type of processing per patch may be denoted region-wise packing.

The transmitter may encode data for the packed 2D image (170). Encoding may be performed in a known, existing 2D image encoding scheme.

The transmitter may encode the data for the encoded packed 2D image and then perform encapsulation (180). Encapsulation may mean processing the encoded data to follow a predetermined transmission protocol by, e.g., splitting the encoded data and processing, e.g., adding heads to the splits.

The transmitter may transmit the encapsulated data (190). The transmitted data may include the data for the packed 2D image and data for reconstructing a 3D image from the packed 2D image (e.g., information about the packing method and projection information about each segment).

As such, the transmitter, according to an embodiment of the disclosure, may reduce the number of points constituting the point clouds via voxelization, thereby reducing the amount of data transmissions and processing loads. Further, the legacy encoding scheme and transmission protocol for 2D images may be utilized, saving costs for developing new encoding and transmission techniques.

As described above, if the data for the 3D image is transformed into 2D and compression is performed, computation may be performed within a pre-defined space range for efficiency of the computation. If the data for the 3D image escapes off the pre-defined space, an error may arise. To prevent such errors, the range of the data for the 3D image may be adjusted to the pre-defined space, and then, compression is performed and, in the restoration process, an inverse transform may be performed to get it back to the original space range. In some embodiments, the space range necessary for transform into the 2D image may be adjusted using the data for the 3D image.

To adjust the space range of the data of the 3D image, various methods with an inverse transform, such as rotation, moving straight, scaling, or transform with matrix, may be taken into consideration.

To adjust the space range necessary for transform into the 2D image using the data for the 3D image, the values of the points of the point cloud are identified, and the maximum/minimum values for each of the x, y, and z axes are calculated. As necessary, the order of the points of the point cloud may be sorted along each direction of the x, y, and z axes. The maximum/minimum values calculated along the x, y, and z axis directions may be utilized in the projection and packing steps and be used to determine the image range and size of image necessary for packing. That is, the position of the point with a minus value is corrected to be 0 or more and, when restored, inversely recorrected. In some embodiments, information (e.g., the maximum, minimum, or medium value, mean, variance, and standard deviation) about the 3D range of the data for the 3D image may previously be recorded in the file containing the data for the 3D image and be read out and utilized to transform into 2D image.

Such adjustment of the space range of the data of the 3D image or adjustment for the data of the 3D image may be performed at a time before voxelization or after voxelization and before segmentation.

Figure 6:
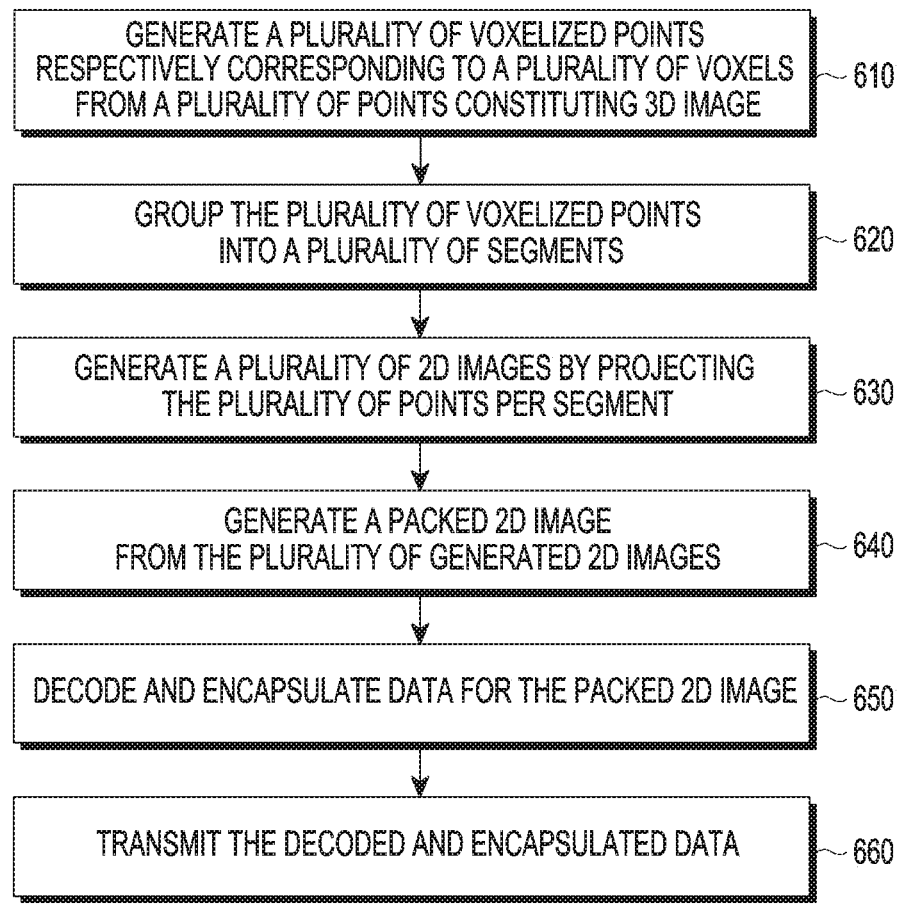
FIG. 6 is a flowchart illustrating operations of a transmitter according to an embodiment of the disclosure.

FIG. 6 is a flowchart illustrating operations of a transmitter according to an embodiment of the disclosure. The operations of the transmitter include the step 610 of generating a plurality of voxelized points respectively corresponding to a plurality of voxels from the plurality of points constituting the 3D image. The size of each voxel may be determined based on the LoD. The LoD may be determined based on the bandwidth upon point cloud capturing and/or the user's position of interest or point of gaze. The coordinates of the voxelized point 220 may be one of i) the coordinates of the center of the corresponding voxel, ii) the coordinates indicating the position of the mean of positions of the points in the voxel, and iii) the coordinates of a random position in the voxel. The color of the voxelized point may be one of i) the mean color of the points 210 in the voxel and ii) the weighted mean color of the points in the voxel considering the position of the voxelized point.

The operations of the transmitter include the step 620 of grouping the plurality of voxelized points into a plurality of segments. In some embodiments, if there is a non-voxelized point in the point cloud (e.g., because the voxel size is set to 0), the transmitter may perform the grouping-into-a plurality of-segments on all of the plurality of voxelized points and one or more non-voxelized points. Grouping the plurality of points into a plurality of segments may be performed based on at least one of the color, texture, position, and normal information of the points.

The operations of the transmitter include the step 630 of generating a plurality of 2D images by projecting the plurality of points per segment. Among the plurality of surfaces of the stereoscopic object for projection, the surface to which the segment is to be projected may be determined per segment. The segment-projected surface may be determined based on the distances between the segment and the surfaces of the stereoscopic object and the direction of the normal of the area on the 3D image adjacent to the segment or the area in the 3D image where the segment is positioned. The plurality of 2D images generated by projection may respectively correspond to the plurality of surfaces of the stereoscopic object.

The operations of the transmitter include the step 640 of generating a packed 2D image from the plurality of generated 2D images. The transmitter may individually process the plurality of generated 2D images to generate the packed 2D image. For example, the plurality of generated 2D images may be individually deformed, resized, rotated, or resampled.

The operations of the transmitter include the step 650 of decoding and encapsulating data for the packed 2D image. Decoding and encapsulation may be performed in the legacy scheme applied to 2D images.

The operations of the transmitter include the step 660 of transmitting the decoded and encapsulated data.

Figure 7:
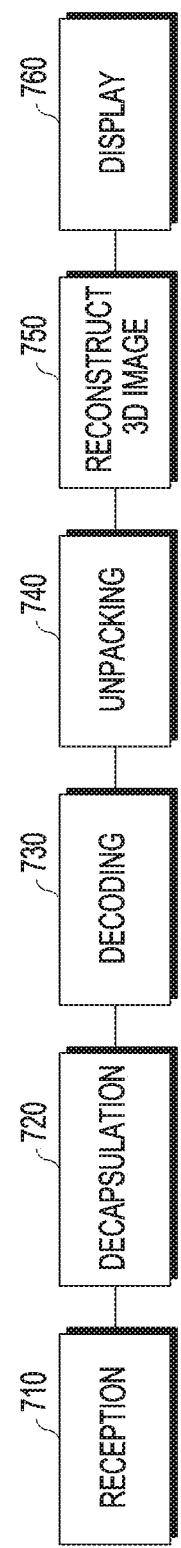
FIG. 7 is a block diagram functionally illustrating a receiver according to an embodiment of the disclosure.

FIG. 7 is a block diagram functionally illustrating a receiver according to an embodiment of the disclosure. The receiver may receive 3D image-related data from a transmitter (810).

The receiver may decapsulate the received data (720). The encoded data generated by the encoding 170 of FIG. 1 may be obtained by decapsulation.

The receiver may perform decoding on the decapsulated data (730). The packed 2D image may be obtained by decoding.

The receiver may perform unpacking on the packed 2D image obtained via decoding (740). A plurality of 2D images (i.e., patches) respectively corresponding to the plurality of surfaces of the stereoscopic object for projection may be obtained via unpacking.

The receiver may reconstruct the 3D image from the plurality of patches (750). Reconstructing the 3D image may mean obtaining information (i.e., the coordinates and color information about each point) about the points constituting the point cloud representing the 3D image.

The receiver may display the reconstructed 3D image (760). According to some embodiments, the receiver may transmit information about the points constituting the point clouds representing the 3D image to another device to display the 3D image.

Figure 8:
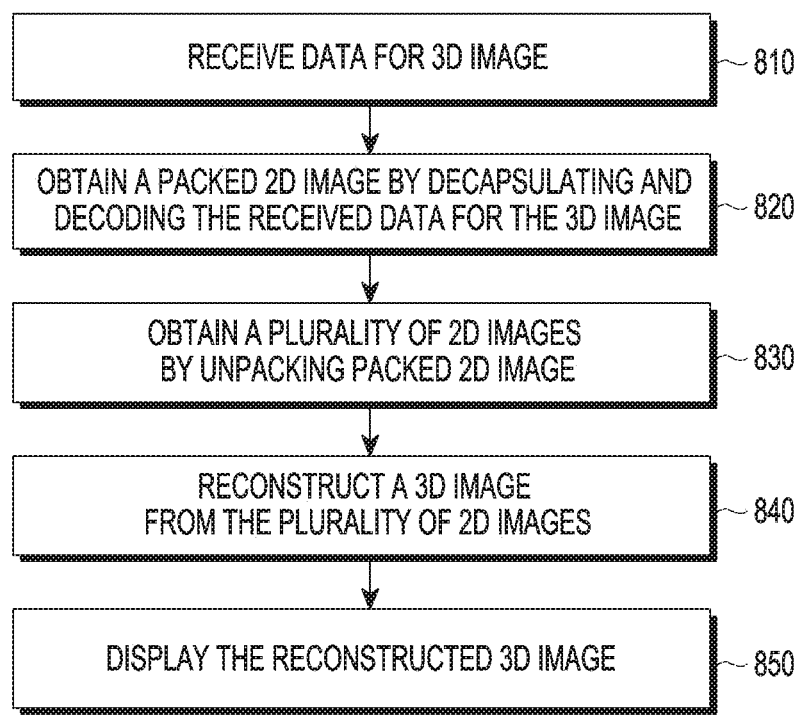
FIG. 8 is a flowchart illustrating operations of a receiver according to an embodiment of the disclosure.

FIG. 8 is a flowchart illustrating operations of a receiver according to an embodiment of the disclosure. The operations of the receiver include the step 810 of receiving the data for the 3D image. The received data for the 3D image may be the same as the data transmitted from the transmitter of FIG. 1.

The operations of the receiver include the step 820 of obtaining a packed 2D image by decapsulating and decoding the received data for the 3D image.

The operations of the receiver include the step 830 of obtaining a plurality of 2D images by unpacking the packed 2D image. The plurality of 2D images may be generated by projecting the plurality of voxelized points per segment. The plurality of voxelized points may be generated to respectively correspond to the plurality of voxels from the plurality of points constituting the 3D image. The plurality of voxelized points may be grouped into a plurality of segments.

The operations of the receiver include the step 840 of reconstructing the 3D image from the plurality of 2D images.

The operations of the receiver include the step 850 of displaying the reconstructed 3D image.

Figure 9:
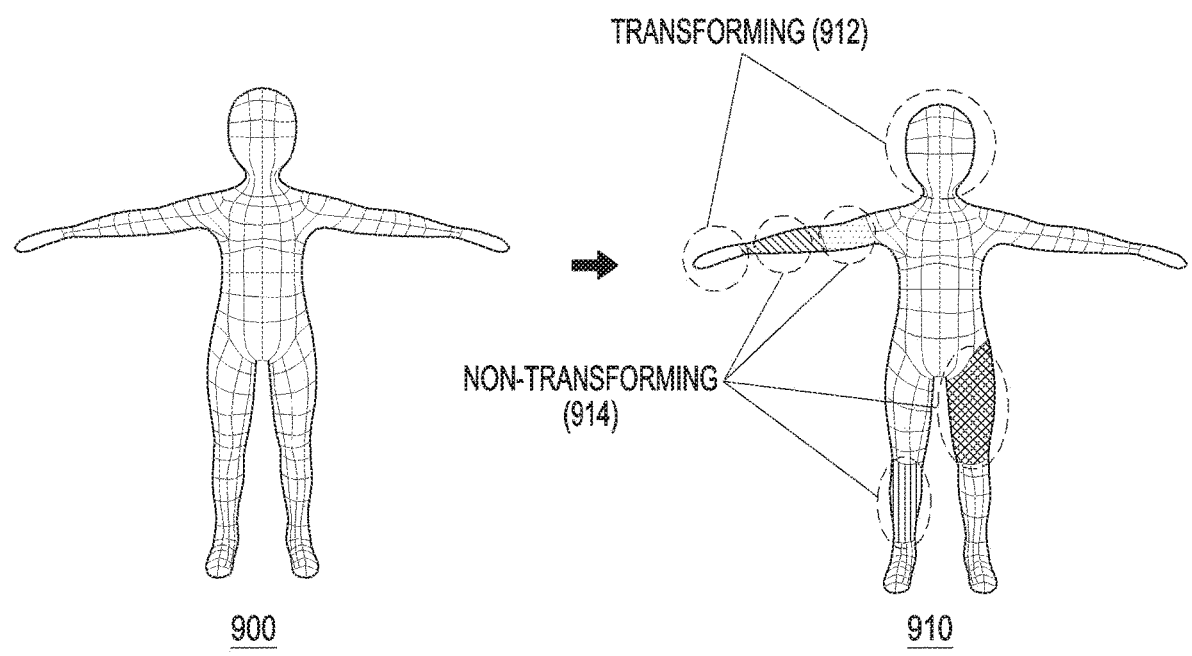
FIG. 9 illustrates a motion estimation method according to an embodiment of the disclosure.

FIG. 9 illustrates a motion estimation method according to an embodiment of the disclosure. A first 3D image 900 represented with a point cloud may be deformed into a second 3D image 910 by the motion of the first 3D image 900. The image deformation due to motion may come up with a change in configuration per segmentation unit (i.e., segment). However, although the 3D image is deformed by motion, a per-segmentation unit configuration change may be unnecessary in all the areas of the 3D image. For example, first areas 912 may be areas where a change in configuration per segmentation unit is made, and second areas 914 may be areas where no change in configuration per segmentation unit is made. The second areas 914 may be areas that are to be less moved by motion than the first areas 912. In some embodiments, the second areas 914 may be areas that are not moved despite motion.

According to embodiments of the disclosure, in a case where 3D images including movement by motion, like the first 3D image 900 and the second 3D image 910, are respectively included in the plurality of frames, voxelization and segmentation may be newly performed only on the areas where a change in configuration per segmentation unit is made and, for the areas where no change in configuration per segmentation unit is made, the results of voxelization and segmentation on the prior frame may be used. Thus, embodiments of the disclosure may reduce the loads for processing dynamic 3D images.

If the points overlap in the direction towards the projection surface when the transmitter performs projection, at least one of the overlapping points may not be reflected to the patch. In such a case, the data received by the receiver may not include the point not reflected to the patch. The point, which is not reflected to the patch due to an overlap between the points, may be denoted as a missing point. A method of repairing missing points in the receiver is described below.

Figure 10:
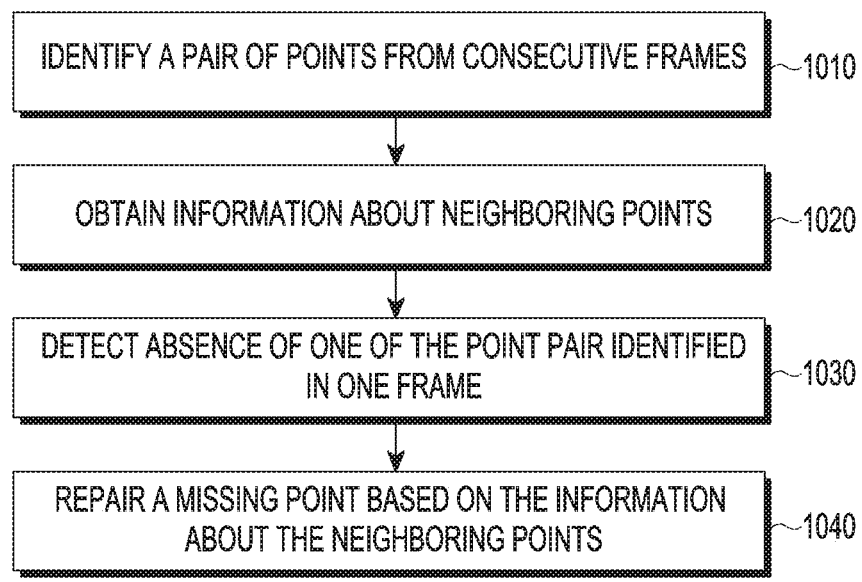
FIG. 10 is a flowchart illustrating a method of repairing a missing point in a receiver.
Figure 11:
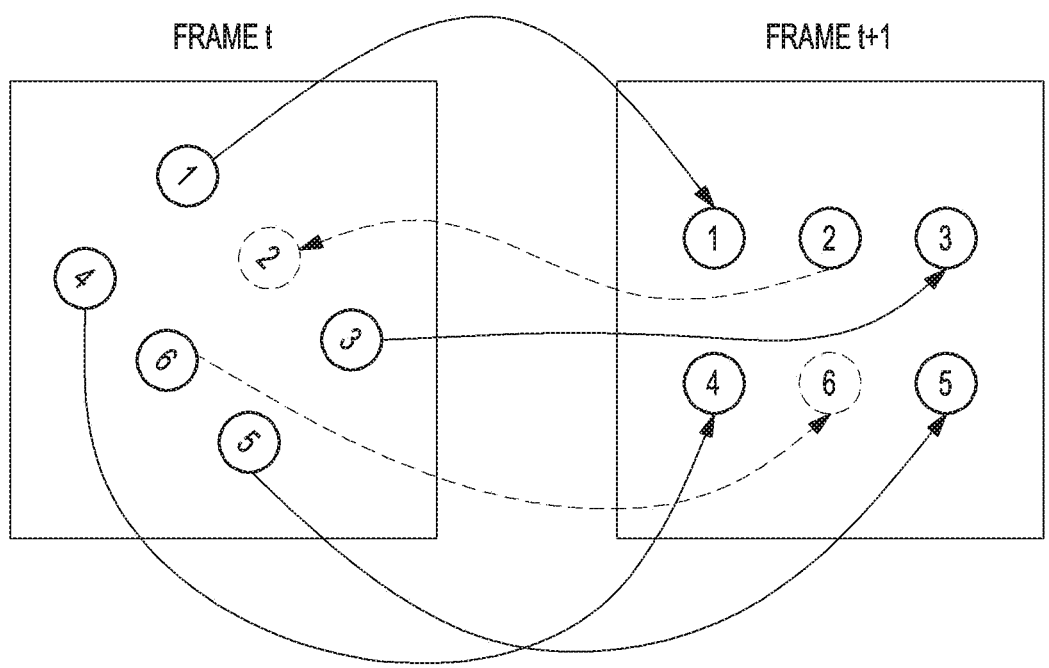
FIG. 11 illustrates points in example consecutive frames.

FIG. 10 is a flowchart illustrating a method of repairing a missing point in a receiver. A method of repairing missing points includes the step 1010 of identifying a pair of points from consecutive frames. The points in the point pair may be the points corresponding to each other and belonging to different frames. The point pair may be identified based on at least one of the position, color, or texture of the points. The receiver may compare the property values (e.g., positions, colors, or texture) of the points belonging to the different frames and, if the difference between the property values is less than, or not more than, a threshold, identify that the points are a pair of points corresponding to each other. Referring to FIG. 11 illustrating points in example consecutive frames, point 1 in frame t and point 1 in frame t+1 may be identified as a point pair. Further, points 2 to 6 in frame t and points 2 to 6 in frame t+1 may be identified as point pairs.

The method of repairing missing points includes the step 1020 of obtaining information about neighboring points of the identified pair of points. The information about the neighboring points may include information indicating the position of each of the neighboring points, information indicating the color of each neighboring point, and information indicating the texture of each neighboring point in each frame. In the example shown in FIG. 11, as information about the neighboring points for the point pair for point 2, position information about point 1 and point 3 in frame t and frame t+1 may be obtained.

The method of restoring missing points includes the step 1030 of detecting the absence of one of the point pair identified in one frame. In the example of FIG. 11, the receiver may detect the absence of point 2 in frame t in relation to the point pair for point 2. Further, the receiver may detect the absence of point 6 in frame t+1 in relation to the point pair for point 6. That is, the receiver may identify that point 2 in frame t and point 6 in frame t+1 are missing points.

The above-described steps of the missing point repairing method may be included in the step 840 of reconstructing a 3D image from a plurality of 2D images.

The missing point repairing method includes the step 1040 of repairing a missing point based on the information about the neighboring points. For example, referring to FIG. 11, the receiver may repair point 6 in frame t+1 based on the information about the neighboring points for point 6 in frame t. The position of point 6 in frame t+1 may be determined considering a relative position of point 6 for the neighboring points in frame t. The color and texture of point 6 in frame t+1 may be determined based on a variation in the color and texture of the neighboring points between frame t and frame t+1 and the color and texture of point 6 in frame t. Missing point 2 in frame t may also be repaired in a similar manner. The position of point 2 in frame t may be determined considering a relative position of point 2 for the neighboring points in frame t+1. The color and texture of point 2 in frame t may be determined based on a variation in the color and texture of the neighboring points between frame t and frame t+1 and the color and texture of point 2 in frame t+1.

In some embodiments, the electronic device may recognize a 3D object in a similar way to comparing frames described above in connection with FIGS. 10 and 11. For example, the electronic device may compare information about the point cloud for a specific object stored in a database and information about a point cloud measured on a target object and determine whether the object indicated by the point cloud stored in the database is identical to the object measured. Similar to step 1010, the electronic device may identify the points of the point cloud stored in the database and corresponding point pairs from the points of the measured point cloud. If the difference in the property value of the points in the corresponding point pairs is less than, or not more than, a threshold, the electronic device may determine that the object indicated by the point cloud stored in the database is the same as the measured object. If no corresponding point pairs are identified, or the ratio of the number of identified point pairs to the number of points of the point cloud is less than, or not more than, a threshold, or the difference in the property value of points in the corresponding point pairs exceeds a threshold or is not less than the threshold, the electronic device may determine that the object indicated by the point cloud stored in the database is not identical to the measured object. Such object recognition method is available in security sectors, such as face recognition. Further, if a 3D object is precisely recognized, the compression efficiency of data for the 3D image may be increased by performing segmentation and projection based on information related to the shape of objects stored in the database.

In the process of transforming 3D data into 2D data and compressing the same, similarity of the transformed 2D data is critical. As the similarity increases, the compression efficiency may rise. The motion of segments corresponding to different frames may be estimated by motion estimation on a 3D object moving over continuous times. By applying motion in the opposite direction of the estimated motion to the segments, data in a similar form to the neighboring frame may be obtained, raising the similarity and hence compression efficiency. Thereafter, a motion compensation step may be added to the restoration process, thereby making it possible to restore to the original motion.

Figure 12:
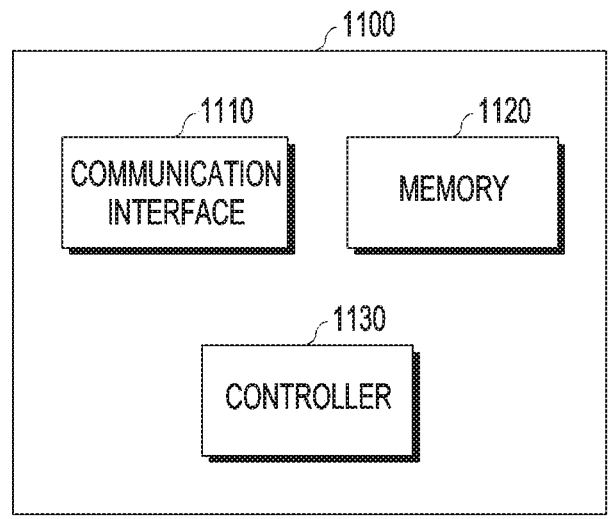
FIG. 12 is a block diagram illustrating a transmitter according to an embodiment of the disclosure.

FIG. 12 is a block diagram illustrating a transmitter according to an embodiment of the disclosure. The transmitter 1200 of FIG. 12 may be a server. The transmitter 1200 may process and transmit data for a 3D image by the above-described methods.

The transmitter 1200 may include a controller 1130, a memory 1120, and a communication interface 1110. The controller 1130 may substantially perform and control the operations performed by the transmitter 1200. The controller 1130 may be connected with the memory 1120 and the communication interface 1110 in an electrically communicable manner and may control the operation of the memory 1120 and the communication interface 1110. Operations directly performed by the memory 1120 and the communication interface 1110 may be interpreted as performed substantially by the controller 1130. The controller 1130 may be configured as at least one processor. The memory 1120 may store transitory or non-transitory data necessary for the operation of the transmitter 1200 or the operation of the controller 1130. The memory 1120 may store commands or codes to be executed by the controller 1130. The communication interface 1110 may be configured to perform data transmission and/or reception.

Figure 13:
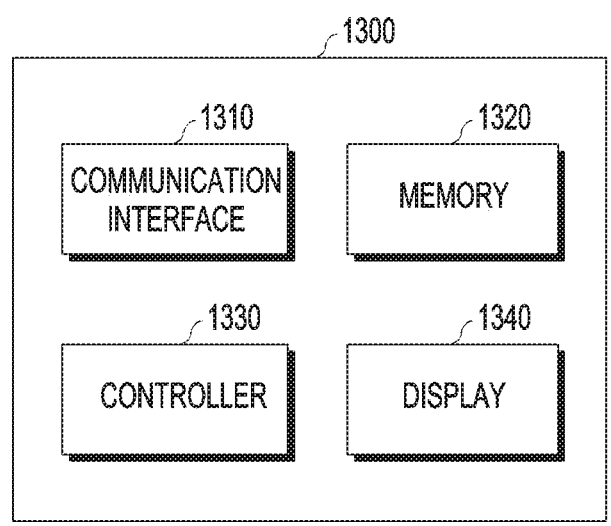
FIG. 13 is a block diagram illustrating a receiver according to an embodiment of the disclosure.

FIG. 13 is a block diagram illustrating a receiver according to an embodiment of the disclosure. The receiver 1300 may receive and process data for a 3D image by the above-described methods.

The receiver 1300 may include a controller 1330, a memory 1320, a communication interface 1310, and a display 1340. Substantially the same description given for the controller 1130, memory 1120, and communication interface 1110 of FIG. 12 may apply to the controller 1330, memory 1320, and communication interface 1310. The display 1340 may display images under the control of the controller 1330.

Although embodiments of the present invention have been described with reference to the accompanying drawings, it will be appreciated by one of ordinary skill in the art that the present disclosure may be implemented in other various specific forms without changing the essence or technical spirit of the present disclosure. Thus, it should be noted that the above-described embodiments are provided as examples and should not be interpreted as limiting.

The invention claimed is:

1. A method for transmitting data for a three-dimensional (3D) image, the method comprising:
   generating a plurality of voxelized points respectively corresponding to a plurality of voxels from a plurality of points constituting the 3D image;
   grouping the plurality of voxelized points into a plurality of segments, each of the plurality of segments including at least one point of the plurality of points;
   generating a plurality of two-dimensional (2D) images by projecting the plurality of points per segment;
   generating a packed 2D image from the plurality of generated 2D images;
   decoding and encapsulating data for the packed 2D image; and
   transmitting the decoded and encapsulated data.

2. The method of claim 1,
   wherein each of the plurality of voxelized points replaces at least one point in a corresponding voxel, and
   wherein coordinates of each of the plurality of voxelized points are one of coordinates of a center of the corresponding voxel, coordinates indicating a position of a mean of positions of the points in the corresponding voxel, or coordinates of a random position in the corresponding voxel.

3. The method of claim 2, wherein a color of each of the plurality of voxelized points is one of a color of a mean of colors of the points in the corresponding voxel or a color of a weighted mean of colors in the voxel considering a position of voxelized point of the corresponding voxel.

4. The method of claim 1,
   wherein the plurality of voxelized points are grouped into the plurality of segments based on at least one of a color, texture, position, and normal information of the plurality of voxelized points,
   wherein the plurality of 2D images are generated by selectively projecting at least one point included in each of the plurality of segments to one of a plurality of surfaces of a stereoscopic object for the projection,
   wherein the surface to which the at least one point included in the segment among the plurality of segments is projected is determined based on distances between the segment and the plurality of surfaces and a direction of a normal related to the segment, and
   wherein a size of each of the plurality of voxels is determined based on a bandwidth for capturing a point cloud corresponding to the 3D image and a position of interest of a user viewing the 3D image or a position of the user's gaze.

5. A device for transmitting data for a three-dimensional (3D) image, the device comprising:
   a communication interface; and
   a controller connected with the communication interface configured to:
      generate a plurality of voxelized points respectively corresponding to a plurality of voxels from a plurality of points constituting the 3D image,
      group the plurality of voxelized points into a plurality of segments, each of the plurality of segments including at least one point of the plurality of points,
      generate a plurality of two-dimensional (2D) images by projecting the plurality of points per segment,
      generate a packed 2D image from the plurality of generated 2D images,
      decode and encapsulating data for the packed 2D image, and
      transmit the decoded and encapsulated data.

6. The device of claim 5,
   wherein each of the plurality of voxelized points replaces at least one point in a corresponding voxel, and
   wherein coordinates of each of the plurality of voxelized points are one of coordinates of a center of the corresponding voxel, coordinates indicating a position of a mean of positions of the points in the corresponding voxel, or coordinates of a random position in the corresponding voxel.

7. The device of claim 6, wherein a color of each of the plurality of voxelized points is one of a color of a mean of colors of the points in the corresponding voxel or a color of a weighted mean of colors in the voxel considering a position of voxelized point of the corresponding voxel.

8. The device of claim 5,
   wherein the plurality of voxelized points are grouped into the plurality of segments based on at least one of a color, texture, position, and normal information of the plurality of voxelized points,
   wherein the plurality of 2D images are generated by selectively projecting at least one point included in each of the plurality of segments to one of a plurality of surfaces of a stereoscopic object for the projection,
   wherein the surface to which the at least one point included in the segment among the plurality of segments is projected is determined based on distances between the segment and the plurality of surfaces and a direction of a normal related to the segment, and
   wherein a size of each of the plurality of voxels is determined based on a bandwidth for capturing a point cloud corresponding to the 3D image and a position of interest of a user viewing the 3D image or a position of the user's gaze.

* * * * *